(12) United States Patent
Koldijk et al.

(10) Patent No.: US 6,337,137 B1
(45) Date of Patent: Jan. 8, 2002

(54) POWDER PAINT BINDER COMPOSITION

(75) Inventors: Fokeltje A. Koldijk; Eimbert G. Belder; Coenraad M. Gehrels; Tosko A. Misev, all of Zwolle (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/417,844

(22) Filed: Oct. 14, 1999

Related U.S. Application Data

(63) Continuation of application No. PCT/NL98/00202, filed on Apr. 9, 1998.

(30) Foreign Application Priority Data

Apr. 14, 1997 (NL) ............................................. 1005809

(51) Int. Cl.$^7$ ........................ B32B 27/36; C08G 63/00; C08G 63/02; C08G 63/12; C08G 63/16
(52) U.S. Cl. ..................... 428/482; 428/480; 528/272; 528/296; 528/297; 528/298; 528/300; 528/302; 528/303; 528/304; 528/306; 528/307; 528/308; 528/308.6
(58) Field of Search ................... 428/480, 482; 525/437, 438; 528/296, 297, 300, 302, 303, 304, 306, 307, 308, 308.6, 272, 298

(56) References Cited

U.S. PATENT DOCUMENTS 3,956,228 A    5/1976    Nogami et al.

FOREIGN PATENT DOCUMENTS

GB    1 295 043        11/1972
JP    51 109 930 A     9/1976

OTHER PUBLICATIONS

Chemical Abstracts, vol. 86, No. 4, Jan. 24, 1977 Columbus, Ohio,US; abstract No. 18522, Nogami, Sumitaka et al.: "Thermosetting powder coating compositions" XP002048411 see abstract.

*Primary Examiner*—Vivian Chen
(74) *Attorney, Agent, or Firm*—Pillsbury Winthrop LLP

(57) ABSTRACT

The invention relates to a powder paint composition comprising a polymer that contains endomethylene tetrahydrophthalic acid units and a crosslinker. The polymer is obtained by preparing an unsaturated polymer in a first step, which then reacts with cyclopentadiene at a temperature between 160 ° C and 220 ° C in a second step. The polymer preferably contains more than 10 wt.% endomethylene tetrahydrophthalic acid units and is preferably an unsaturated polymer.

9 Claims, No Drawings

POWDER PAINT BINDER COMPOSITION

This is a continuation of International Appln No PCT/NL98/00202 filed Apr. 9, 1998.

The invention relates to a powder paint binder composition comprising a polymer that contains endomethylene tetrahydrophthalic acid (HIMIC) units.

A powder paint binder composition based on such a polymer is described in U.S. Pat. No. 3,956,228. This patent discloses the esterification of a mixture, consisting of 10–50 mol % endomethylene tetrahydrophthalic acid (HIMIC) and dibasic acids with a glycol after which curing to yield a coating takes place by means of air drying. The coatings based on these compositions exhibit poor mechanical properties such as impact resistance.

Furthermore these compositions do not result in colorless or light-colored powder coatings.

It is an object of the present invention to provide a powder paint binder composition comprising HIMIC-units which composition results in powder coatings having a good impact resistance.

The powder paint binder composition according to the invention comprises a polymer that contains endomethylene tetrahydrophthalic acid units and a crosslinker.

This binder composition has a good storage stability and a good reactivity and after curing results in a powder coating with a combination of desirable properties such as, for example, good flow, hardness, scratch resistance, chemical resistance and mechanical properties.

Furthermore, in spite of the presence of HIMIC double bonds in the curable polymer a light coloured powder coating can be obtained.

According to a preferred embodiment of the invention the acid or hydroxyl functional polymer containing HIMIC units is obtained by first preparing an unsaturated polymer which is subsequently reacted with cyclopentadiene (CPD) at a temperature between about 160° C. to about 220° C.

Generally, prior art two-step methods for the preparation of polyesters are difficult to control due to several exothermic reactions resulting from HIMIC being prepared in the first step followed by the combination with other monomers in a second step and subsequent esterification of the polymer. Said exothermic reactions can lead to high pressures and to high temperatures.

The two step procedure according to the present invention provides a safe process.

According to another preferred embodiment of the invention the polymer contains at least 10 wt. % HIMIC but less than 100 wt. % (relative to the monomers), and preferably between about 35 and about 80 wt. %, as a result of which the good impact resistance is obtained.

The HIMIC-units in the polymer can (in contrast to the HIMIC-units in the polymer according to U.S. Pat. No. 3,956,228) act as functional acid end groups which can react with the crosslinkers.

It is a further advantage that the less reactive, compared with for example fumaric acid, HIMIC need not be incorporated and is not obtained until the reaction over the acid groups has taken place, so that the overall reaction time can be shortened and a well defined product can be obtained.

Preferably the unsaturated polymer is an unsaturated polyester.

The unsaturated polester prepared in the the first step is generally formulated from one or more aliphatic and/or cycloaliphatic mono-, di- and/or polyvalent alcohols and one or more aliphatic, cycloaliphatic and/or aromatic di- or polyvalent carboxylic acids and/or esters derived therefrom. If desired also monocarboxylic acids can be applied.

Examples of suitable alcohols include benzyl alcohol, ethylene glycol, propylene glycol, neopentyl glycol, butane diol, hexane diol, dimethylol cyclohexane, diethylene glycol, glycerol, trimethylol propane, pentaerythritol, dipentaerythritol, hydrated bisphenol-A, 2,2-bis-(2-hydroxyethoxy)phenylpropane and/or 2,2-bis-2-hydroxypropoxy phenylpropane. Instead of or in addition to the alcohol compound(s) one or more epoxy compounds, such as for example ethylene oxide, propylene oxide and/or allylglycidyl ether or dicyclopentadiene can be used.

Examples of suitable di- or polyvalent carboxylic acids include maleic acid, fumaric acid, itaconic acid, citraconic acid, malonic acid, succinic acid, glutaric acid, adipic acid, sebacic acid, 1,4-cyclohexane dicarboxylic acid, hexahydrophthalic acid, hexachloroendomethylene tetrahydrophthalic acid, dichlorophthalic acid, isophthalic acid, terephthalic acid and/or trimellitic acid or esters thereof. The carboxylic acid can also be used in the form of an anhydride, for example tetrahydrophthalic anhydride, endomethylene tetrahydrophthalic anhydride, hexahydrophthalic anhydride, maleic anhydride or phthalic anhydride.

For the acid component fumaric acid in combination with isophthalic acid and/or terephthalic acid can be used. Optionally, saturated or unsaturated monocarboxylic acids, such as synthetic and/or natural fatty acids with 2 to 36 carbon atoms or esters prepared from these carboxylic acids and polyvalent alcohols such as glycerol can also be used. Examples of suitable monocarboxylic acids are lauric acid, stearic acid, oleic acid, linolic acid, benzoic acid, acrylic acid and/or methacrylic acid.

According to a preferred embodiment of the invention the unsaturated polymer is an unsaturated is polyester containing fumaric acid, maleic acid (anhydride) and/or terephthalic acid as acid units.

The alcohol component of the unsaturated polyester is preferably ethylene glycol, propylene glycol and/or neopentyl glycol.

The unsaturated polyester may be both crystalline and amorphous.

The amount of double bonds in the unsaturated polyester is usually between about 120 and about 2000 grams per unsaturated group and preferably between about 125 and about 1500.

The molecular weight $M_n$ (number average molecular weight) of the unsaturated polyester is usually between about 500 and about 6000, preferably between about 1000 and about 4500.

Acid functional polyesters usually have an acid number between about 25 mg KOH/grams resin and about 145 mg KOH/grams resin, preferably an acid number between about 30 mg KOH/grams resin and about 120 mg KOH/grams resin.

Hydroxyl-functional polyesters usually have a hydroxyl number between about 25 mg KOH/grams resin and about 145 mg KOH/grams resin, preferably a hydroxyl number between about 30 mg KOH/grams resin and about 120 mg KOH/grams resin.

The functionality is generally between about 1.5 and about 4 and is preferably between 1.9 and 3.5.

The polymerization reaction in the preparation of the unsaturated polyester generally takes place in the presence of catalysts and inhibitors.

Suitable catalysts include for example tetrabutyl titanate and dibutyl tin oxide.

Suitable inhibitors include for example butyl alcohol and hydroquinone.

In the formation of the unsaturated polyester catalysts and inhibitors are generally used in amounts between about 0.005 and about 1 wt. % relative to the monomers.

The preparation of the unsaturated polyester can take place via a one-step process or via a multistep process.

If the unsaturated polyester preparation takes place via a one-step process, glycols, acids, catalysts and optionally inhibitors can be esterified to the desired acid number or hydroxyl number at a temperature lower than 220° C. To remove low-molecular material or to obtain the desired acid number or hydroxyl number, optionally a vacuum can be applied at reduced temperature.

If the unsaturated polyester preparation takes place in two steps, in the first step saturated acids, glycols, catalysts and inhibitors can be esterified at temperatures between, for example, about 210° C. to about 260° C. during for a period of about 2–10 hours, and in the second step the unsaturated compounds, acids and glycols can be esterified at temperatures between, for example, about 180° C. to about 220° C. for a period of about 5–16 hours. The monomers and the reaction conditions can be varied depending on the desired properties.

After the unsaturated polyester has been obtained dicyclopentadiene (DCPD) is added to the unsaturated polyester at temperatures between about 160° C. and about 220° C. resulting in a retro Diels-Alder reaction forming CPD.

Next the cyclopentadiene (CPD) and the fumaric acid or maleic acid groups in the unsaturated polyester react by forming HIMIC-units. The amount of DCPD added is generally between 2 and 40 wt. % relative to the total weight of the monomers.

The functional acid or hydroxyl groups do not react during this reaction and can at a later stage, in the presence of a suitable crosslinker, cure to yield a powder coating.

Preferably the polymer that contains HIMIC units contains virtually no linear alkyl chains with more than 5 carbon atoms. This results in a higher glass transition temperature, while the flow is very good.

The preparation of thermosetting powder coatings in general and the chemical curing reactions of powder paints to form cured coatings are described by Misev in Powder Coatings, Chemistry and Technology (1991, John Wiley) on pp. 42–54, p. 148 and 224–226 the complete disclosure of which is incorporated herein by reference. A thermosetting binder composition is generally defined as the resinous part of the powder paint comprising a polymer and crosslinker.

Depending on the functionality and nature of the polymer, crosslinkers such as, for example, triglycidyl isocyanurate (TGIC), blocked isocyanates, amino resins, bisphenol-A epoxy resins, compounds containing β-hydroxyalkyl amide groups, and crosslinkers that contain epoxy groups and that have an aliphatic chain with 5–26 carbon atoms such as epoxidized oils, can be selected.

Preferably TGIC and bisphenol-A epoxy resin are used as crosslinker in the present invention.

The polymer:crosslinker weight ratio can be adjusted as necessary depending on the final use of the powder paint binder composition. It is also possible to use a mixture of resins. The ratio between functional polymer groups:functional crosslinker groups can range, for example, between about 1:0.5 and 1:1.5.

The powder paint binder composition and the powder paint system according to the invention can, if desired, include customary additives such as, for example, pigments, fillers, degassing agents, flow agents and stabilizers.

Suitable pigments include without limitation inorganic pigments, such as for example titanium dioxide, zinc sulphide, iron oxide and chromium oxide, as well as organic pigments, such as for example azo compounds. Suitable fillers include, for example, metal oxides, silicates, carbonates and sulphates.

Suitable stabilizers, include, for example, of primary and/or secondary antioxidants, UV stabilizers such as, for example, quinones, (sterically hindered) phenolic compounds, phosphonites, phosphites, thioethers and HALS compounds (hindered amine light stabilizers).

Suitable degassing agents include for example benzoin and cyclohexane dimethanol bisbenzoate.

Suitable flow agents include for example, polyalkyl acrylates, fluorohydrocarbons and silicon oils. Other suitable additives include, for example, additives for improvement of the tribo-electric charging properties, such as sterically hindered tertiary amines, which are described in EP-B-371528.

Powder paints according to the invention can be applied in the customary manner, for example by electrostatic spraying of the powder onto an earthed substrate and curing of the coating by exposure to heat at a suitable temperature during a sufficiently long period depending on for example the susbtrate. The powder applied can, for example, be heated in a gas oven, an electric furnace or by means of infrared radiation.

Thermosetting coatings from powder paint (coating) compositions for use in industrial applications are further described in a general sense in Powder Coatings, Chemistry and Technology, Misev, pp. 141–173 (1191), the complete disclosure of which incoporated herein by reference.

Compositions according to the present invention can be used in powder coatings intended for use on metal, wood, paper and plastic substrates. The preferred susbtrate is metal. Examples are general-purpose top coats for use in industry, equipment coatings and for example for cans, domestic and other small equipment. The coatings are also highly suitable in the automotive industry for coating of external and/or internal parts.

The invention will be further demonstrated with reference to the following, non-limiting examples.

EXPERIMENT I

Preparation of a HIMIC-containing Polyester

A 2-liter reactor vessel with thermometer, stirrer and distillation set-up was filled with 361 g neopentyl glycol, 493 g terephthalic acid, 0.05 wt. % dibutyltin oxide and 0.10 wt. % triphenyl phosphite. After this, with a nitrogen stream being supplied for 8 hours, the temperature was raised to 225° C. while water was distilled off. After the temperature of the distilled-off water had dropped to 80° C., the mixture was cooled to 160° C., after which 88 g fumaric acid and 0,5 g t-butyl hydroquinone were added. The temperature was then raised to 205° C. in 9 hours. At an acid value of 49 mg KOH/g resin, cooling to 185° C. took place and a vacuum was applied for 30 minutes.

Subsequently, the temperature was raised to 200° C. and 58 g dicyclopentadiene was metered in an hour. The temperature was then kept at 180° C. for half an hour, after which a vacuum was applied for half an hour.

The polyester with 20 wt. % HIMIC was characterized by:

| | |
|---|---|
| acid number: | 42 mg KOH/g resin |
| hydroxyl number: | 7 mg KOH/g resin |
| viscosity: | 190 dPas (Emila, 165° C.) |
| glass transition temperature: | 60° C. (Mettler, TA3000, 5° C./min.) |

In the following examples the characteristics are determined as follows:

| | |
|---|---|
| gel time: | DIN 5599 Part B 200° C. |
| flow: | visually |
| reversed impact: | ASTM-D2794/69 |
| colour: | Dr. Lange Cielab DIN 6174 |
| gloss: | ASTM D523/70 |

EXAMPLE I

Powder Paint Preparation

A physical mixture consisting of 140 g polyester according to Experiment I, 60 g bisphenol A epoxy (Aradite GT7004™), 100 g titanium dioxide (Kronos 2310™), 3 g Resiflow-PV5™ (polyacrylate flow agent from Worlée), 0.4 g triphenyl methyl phosphoniumbromide and 1.5 g benzoin was first mixed in a premixer (Prism Premixer Lab 6) and then mixed in an extruder (Prism, TSE 16 PC). The extrudate was cooled, ground and screened, yielding a powder paint having a particle size of 90 $\mu$. The powder paint was then electrostatically applied, in a layer thickness of about 50 $\mu$, on a metal substrate and cured for 10 minutes at 200° C. in an air circulation furnace.

The properties of the resulting powder paint and powder coating were as follows:

| | |
|---|---|
| gel time | 110 sec |
| flow | good |
| reversed impact | 160 inchpound |
| colour | L* 96.0, a* −0.3 b* 1.3 |
| gloss 20° | 90 |
| gloss 60° | 98 |

The powder paint binder composition based on the polyester with 20% HIMIC resulted in a powder coating with good flow properties and in a light-coloured coating having an excellent reversed impact resistance, colour and flow.

EXAMPLE II

Powder Paint Preparation

A physical mixture consisting of 328 g polyester according to Experiment I, 21,3 trisglycidylisocyanurate (Aradite PT 810™), 175 g titanium dioxide (Kronos 2310™), 5,25 g Resiflow-PV5™ (polyacrylate flow agent from Worlée), 0.1 g triphenyl methyl phosphoniumbromide and 2.63 g benzoin was first mixed in a premixer (Prism Premixer Lab 6) and then mixed in an extruder (Prism, TSE 16 PC). The extrudate was cooled, ground and screened, yielding a powder paint having a particle size of 90 $\mu$. The powder paint was then electrostatically applied, in a layer thickness of about 50 $\mu$, on a metal substrate and cured for 10 minutes at 200° C. in an air circulation furnace.

The properties of the resulting powder paint and powder coating were as follows:

| | |
|---|---|
| gel time | 157 sec |
| flow | good |
| reversed impact | 160 inchpound |
| colour | L* 96.0, a* −0.3 b* 1.4 |
| gloss 20° | 86 |
| gloss 60° | 94 |

The powder paint binder composition comprising TGIC as crosslinker (instead of the epoxy crosslinker in Example I) also resulted in a powder coating with good flow properties and in a light-coloured coating having an excellent reversed impact resistance, colour and flow.

Comparative Example A

Example I has been repeated without a crosslinker with curing by heating in the air (10 minutes, 200° C.)

The properties of the resulting powder paint and powder-coating were as follows:

| | |
|---|---|
| gel time | >480 sec |
| reversed impact | <20 |
| flow | moderate |
| gloss 20° | 89 |
| gloss 60° | 97 |

In case the curing takes place in the absence of a crosslinker the impact resistance is unacceptable. The value of the gel time made clear that there is nearly no crosslinking.

EXPERIMENT II

Preparation of a HIMIC-containing Polyester

A 3-liter reactor vessel with thermometer, stirrer and distillation set-up was filled with 604.1 g propylene glycol, 820.6 g terephthalic acid, 160.8 g trimethylol propane, 0.05 wt. % dibutyltinoxide and 0.10 wt. % triphenyl phosphate. After this, with a nitrogen stream being supplied for 8 hours, the temperature was raised to 225° C. while water was distilled off. After the temperature of the distilled-off water had dropped to 80° C., the mixture was cooled to 160° C., after which 764.9 g fumaric acid and 1.1 g t-butyl hydroquinone were added. The temperature was then raised to 205° C. in 9 hours. At an acid value of 138 mg KOH/g resin, cooling to 185° C. took place and a vacuum was applied for 30 minutes.

Subsequently, the temperature was raised to 200° C. and 435.2 g dicyclopentadiene was metered in an hour. The temperature was then kept at 180° C. for half an hour, after which a vacuum was applied for half an hour.

The polyester with 45 wt. % HIMIC was characterized by:

| | |
|---|---|
| acid number | 81 mg KOH/g resin |
| hydroxyl number | 8 mg KOH/g resin |
| viscosity | 140 dPas (Emila, 165° C.) |
| glass transition temperature | 61° C. (Mettler, TA3000, 5° C./min.) |

EXAMPLE III

Powder Paint Preparation

A physical mixture consisting of 100 g polyester according to Experiment II, 100 g bisphenol A epoxy (Aradite GT7004™), 100 g titanium dioxide (Kronos 2310™), 3 g Resiflow-PV5™ (polyacrylate flow agent from Worlée), 0.4 g triphenyl methyl phosphoniumbromide and 1.5 g benzoin was first mixed in a premixer (Prism Premixer Lab 6) and then mixed in an extruder (Prism, TSE 16 PC). The extrudate was cooled, ground and screened, yielding a powder paint having a particle size of 90µ. The powder paint was then electrostatically applied, in a layer thickness of about 50µ, on a metal substrate and cured for 10 minutes at 200° C. in an air circulation furnace.

The properties of the resulting powder paint and powder coating were as follows:

| flow | good |
|---|---|
| reversed impact | 160 inchpound |
| colour | L* 95.0 |
| | a* −0.7 |
| | b* 1.1 |

The powder paint binder composition comprising a polyester with 45% by weight HIMIC resulted in a powder coating with good flow properties and in a light-coloured coating having an excellent reversed impact resistance.

EXPERIMENT III

Preparation of a HIMIC-containing Polyester

A 2-liter reactor vessel with thermometer, stirrer and distillation set-up was filled with 215 g ethylene glycol, 281 g terephthalic acid, 0.05 wt. % dibutyltinoxide and 0.10 wt. % triphenyl phosphite. After this, with a nitrogen stream being supplied for 5 hours, the temperature was raised to 225° C. while water was distilled off. After the temperature of the distilled-off water had dropped to 80° C., the mixture was cooled to 160° C., after which 276 g fumaric acid and 1.1 g t-butyl hydroquinone were added. The temperature was then raised to 205° C. in 2 hours. At an acid value of 118 mg KOH/g resin, cooling to 185° C. took place and a vacuum was applied for 30 minutes.

Subsequently, the temperature was raised to 200° C. and 228 g dicyclopentadiene was metered in an hour. The temperature was then kept at 180° C. for half an hour, after which a vacuum was applied for half an hour.

The polyester with 50 wt. % HIMIC was characterized by:

| acid number | 81 mg KOH/g resin |
|---|---|
| hydroxyl number | 13 mg KOH/g resin |
| viscosity | 150 dPas (Emila, 165° C.) |
| glass transition temperature | 39° C. (Mettler, TA3000, 5° C./min.) |

EXAMPLE IV

Powder Paint Preparation

A physical mixture consisting of 100 g polyester according to Example III, 100 g bisphenol A epoxy (Aradite GT7004™), 100 g titanium dioxide (Kronos 2310™), 3 g Resiflow-PV5™ (polyacrylate flow agent from Worlée), 0.4 g triphenyl methyl phosphoniumbromide and 1.5 g benzoin was first mixed in a premixer (Prism Premixer Lab 6) and then mixed in an extruder (Prism, TSE 16 PC). The extrudate was cooled, ground and screened, yielding a powder paint having a particle size of 90µ. The powder paint was then electrostatically applied, in a layer thickness of about 50µ, on a metal substrate and cured for 10 minutes at 200° C. in an air circulation furnace.

The properties of the resulting powder paint and coating were as follows:

| geltime | 158 sec. |
|---|---|
| flow | good |
| reversed impact | 160 inchpound |
| colour | L* 95.0, |
| | a* −0.3 |
| | b* 1.7 |
| gloss 20° | 80 |
| gloss 60° | 98 |

Also a powder paint binder composition based on the ethylene glycol based polyester with 50 wt. % HIMIC resulted in a powder coating with good flow properties and in a light-coloured coating having an excellent reversed impact resistance.

EXPERIMENT IV

One-step-preparation of a HIMIC-containing Polyester

A 2-liter reactor vessel with thermometer, stirrer and distillation set-up was filled with 141 g propylene glycol, 441 g fumaric acid, 142 g neopentylglycol, 0.05 wt. % dibutyltinoxide and 0.10 wt. % triphenyl phosphite. After this, with a nitrogen stream being supplied for 6 hours, the temperature was raised to 205° C. while water was distilled off. At an acid value of 140 mg KOH/g resin, cooling to 185° C. took place and a vacuum was applied for 30 minutes.

Subsequently, the temperature was raised to 190° C. and 275 g dicyclopentadiene was metered in an hour. The temperature was then kept at 180° C. for half an hour, after which a vacuum was applied for half an hour.

The polyester with 72 wt. % HIMIC was characterized by:

| acid number | 54 mg KOH/g resin |
|---|---|
| hydroxyl number | 5 mg KOH/g resin |
| viscosity | 40 dpas (Emila, 165° C.) |
| glass transition temperature | 34° C. (Mettler, TA3000, 5° C./min.) |

EXAMPLE V

Powder Paint Preparation

A physical mixture consisting of 118 g polyester according to Experiment IV, 82 g bisphenol A epoxy (Aradite GT7004™), 100 g titanium dioxide (Kronos 2310™), 3 g Resiflow-PV5™ (polyacrylate flow agent from Worlée), 0.4 g triphenyl methyl phosphoniumbromide and 1.5 g benzoin was first mixed in a premixer (Prism Premixer Lab 6) and then mixed in an extruder (Prism, TSE 16 PC). The extrudate was cooled, ground and screened, yielding a powder paint having a particle size of 90µ. The powder paint was then electrostatically applied, in a layer thickness of is about 50µ, on a metal substrate and cured for 10 minutes at 200° C. in an air circulation furnace.

The properties of the resulting powder paint and coating were as follows:

| | |
|---|---|
| geltime | 128 sec. |
| flow | moderate/good |
| reversed impact | 160 inchpound |
| colour | L* 93.0, |
| | a* 0.4 |
| | b* 3.4 |
| gloss 20°: | 82 |
| gloss 60°: | 97 |

Very surprisingly even the powder paint binder composition based on a polyester with said relatively very high amount HIMIC resulted in a powder coating with good flow properties and in a light-coloured coating having an excellent reversed impact resistance.

EXPERIMENT V

Preparation of a HIMIC-containing End-capped Polyester

A 2-liter reactor vessel with thermometer, stirrer and distillatipn set-up was filled with 319 g neopentylglycol, 204 g terephtalic acid, 0.05 wt. % dibutyltinoxide and 0.10 wt. % triphenyltinphosphite. After this, with a nitrogen stream being supplied for 5 hours, the temperature was raised to 205° C. while water was distilled off. After the temperature of the distilled-off water had dropped to 80° C., the mixture was cooled to 160° C., after which 213 g fumaric acid and 0,3 g t-butyl hydroquinone were added. The temperature was then raised to 205° C. in 2 hours. At an acid value of 140 mg KOH/g resin, cooling to 124° C. took place and a vacuum was applied for 30 minutes.

Subsequently, the temperature was raised to 190° C. and 143 g dicyclopentadiene was metered in an hour. The temperature was then kept at 180° C. for half an hour, after which a vacuum was applied for half an hour. 120 g trimellitic anhydride was added and the temperature was kept constant at 180° C. for one hour.

The polyester with 36 wt. % HIMIC was characterized by:

| | |
|---|---|
| acid number | 76 mg KOH/g resin |
| hydroxyl number | 10 mg KOH/g resin |
| viscosity | 710 dPas (Emila, 165° C.) |
| glass transition temperature | 57° C. (Mettler, TA3000, 5° C./min.) |

EXAMPLE VI
Powder Paint Preparation

A physical mixture consisting of 120 g polyester according to Experiment V, 80 g bisphenol A epoxy (Aradite GT7004™), 100 g titanium dioxide (Kronos 2310™), 3 g Resiflow-PV5™ (polyacrylate flow agent from Worlée), 0.4 g triphenyl methyl phosphoniumbromide and 1.5 g benzoin was first mixed in a premixer (Prism Premixer Lab 6) and then mixed in an extruder (Prism, TSE 16 PC). The extrudate was cooled, ground and screened, yielding a powder paint having a particle size of 90 μ. The powder paint was then electrostatically applied, in a layer thickness of about 50μ, on a metal substrate and cured for 10 minutes at 200° C. in an air circulation furnace.

The properties of the resulting powder paint and coating were as follows:

| | |
|---|---|
| geltime | 81 sec. |
| flow | good |
| reversed impact | 160 inchpound |
| colour | L* 96.0, |
| | a* −0.8 |
| | b* 1.1 |
| gloss 20° | 89 |
| gloss 60° | 98 |

What is claimed is:

1. A curable powder paint binder composition comprising a polymer comprising functional endomethylene tetrahydrophthalic acid units; and a crosslinker, wherein the polymer is obtained by preparing an unsaturated polymer, and subsequently reacting said unsaturated polymer with cyclopentadiene at a temperature between 160° C. and 220° C.

2. A composition according to claim 1, wherein the polymer contains at least 10 wt. % functional endomethylene tetrahydrophthalic acid units.

3. A composition according to claim 1, wherein the polymer is an unsaturated polyester.

4. A composition according to claim 3, wherein the unsaturated polyester contains acid units selected from the group consisting of fumaric acid units, maleic acid units, and terephthalic acid units, and alcohol units selected from the group consisting of ethylene glycol units, polypropylene glycol units and neopentyl glycol units.

5. A composition according to claim 1, wherein the crosslinker is triglycidyl isocyanurate or bisphenol-A epoxy resin.

6. A composition according to claim 1, wherein the polymer is at least essentially-free of linear alkyl chains with more than 5 carbon atoms.

7. A powder paint composition comprising a binder composition according to claim 1, and optionally pigment, catalyst, fillers and additives.

8. A powder coating obtained after curing a powder paint composition according to claim 7.

9. A substrate at least partially coated with a coating formed from a powder coating according to claim 8.

* * * * *